Feb. 7, 1950   R. H. WEEKS   2,496,924
TRACTION DEVICE FOR POWER-DRIVEN VEHICLES
Filed June 3, 1948
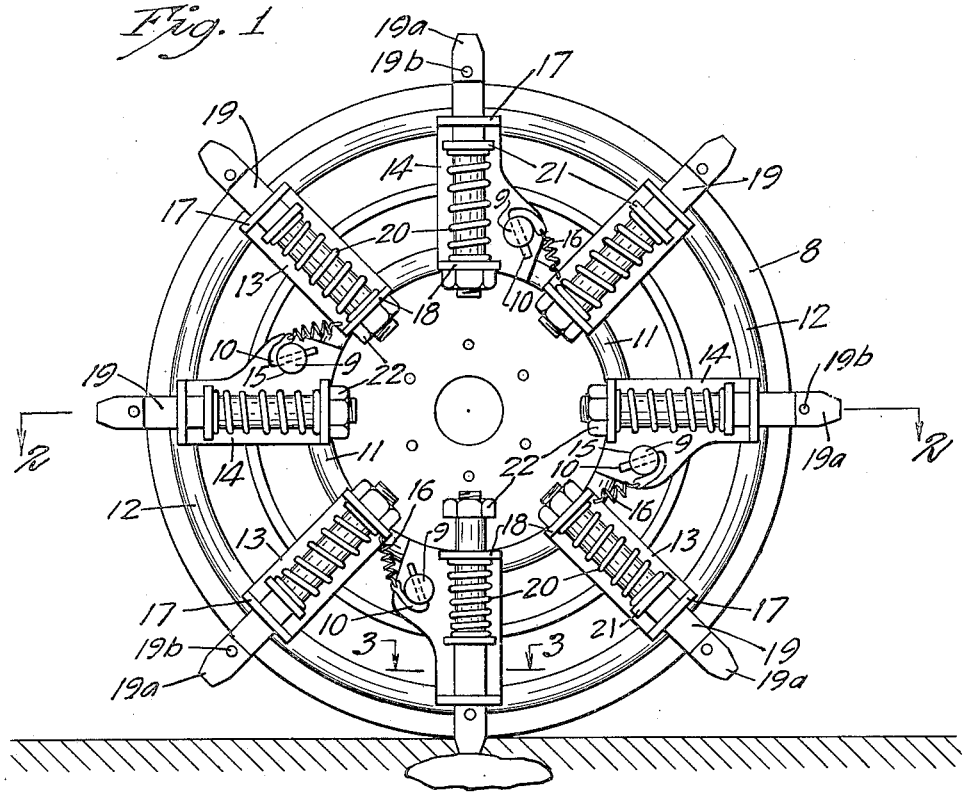
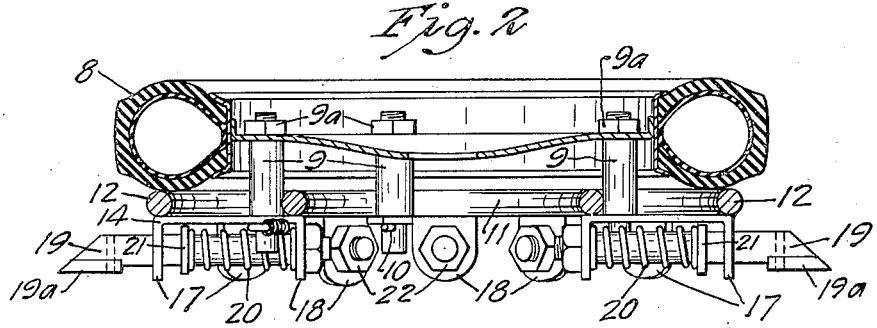
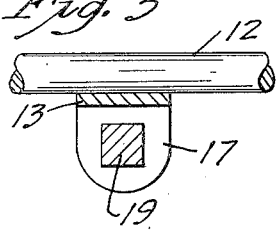
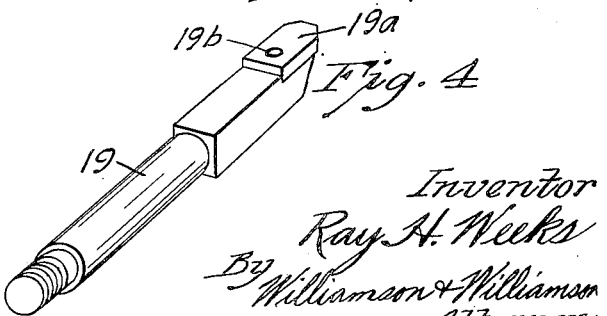
Inventor
Ray H. Weeks
By Williamson & Williamson
Attorneys Patented Feb. 7, 1950

2,496,924

UNITED STATES PATENT OFFICE 2,496,924

TRACTION DEVICE FOR POWER-DRIVEN VEHICLES

Ray H. Weeks, Lake Benton, Minn.

Application June 3, 1948, Serial No. 30,800

1 Claim. (Cl. 301—51)

This invention relates to traction devices for the driving wheels of automotive vehicles.

It is an object of my invention to provide an easily attachable, highly efficient, traction device for the driving wheels of vehicles having a plurality of radially extending traction elements or pins projected outwardly beyond the periphery of the vehicle wheel.

More specifically, it is an object to provide a traction device for the driving wheels of a vehicle having a supporting frame adapted to be easily attached to a driving wheel of a vehicle and including a plurality of radially extending traction elements having portions thereof respectively extended outwardly beyond the periphery of the wheel for engagement with and penetration of the surface on which said vehicle is supported.

It is another object of my invention to provide a traction device for attachment to the driving wheels of a vehicle having a plurality of sharpened traction elements adapted to normally penetrate the ground surface to provide traction for the driving wheels of a vehicle but being resiliently retractable when more than a predetermined resistance to penetration is encountered.

These and other objects and advantages of my invention will more fully appear from the following description made in connection with the accompanying drawings wherein like reference characters refer to the same or similar parts throughout the several views and in which;

Fig. 1 is a side elevational view of a typical form of my traction device as mounted on a vehicle wheel and showing one of the traction elements partially retracted;

Fig. 2 is a transverse sectional view taken substantially along the line 2—2 of Fig. 1 showing the means for mounting the supporting frame on the vehicle wheel;

Fig. 3 is a fragmentary sectional view showing the connection between the supporting frame and the guiding and retaining bracket for one of the traction elements; and, Fig. 4 is a perspective view of one of the traction elements.

As illustrated in the accompanying drawings, I provide a traction device adapted to be easily and quickly attached to the driving wheels such as the wheel 8 shown in Figs. 1 and 2. Said wheel 8 has a plurality of peripherally spaced, outstanding mounting studs 9 fixed thereto and extending laterally outwardly therefrom. In the form shown each of these studs 9 has a transverse aperture formed through the outer portion thereof and this aperture is adapted to receive a retaining pin therethrough such as the pin 10 best shown in Fig. 1. The studs 9 are retained on wheel 8 as by the nuts 9a which fix said studs to the disc portion of the wheel as best shown in Fig. 2.

A supporting frame has a pair of concentric rigid rings 11 and 12 interconnected by the interconnection bars or plates 13 and 14. The interconnection plates 14 have widened inner portions each with a stud receiving aperture 15 formed therein. The plates 13 and 14 are welded to the rings 11 and 12 and traverse the space therebetween to rigidly interconnect the same and the plates 14 are spaced so that the respective apertures 15 therein are adapted to receive the studs 9 therethrough to attach the supporting frame onto the vehicle wheel. The retaining pins 10 are respectively inserted through the apertures formed in the upper portions of the studs 9 and securely hold the supporting frame onto the wheel. Each of the pins 10 has a resilient element such as the spring 16 to retain the same in locked position in its respective aperture. Each of the plates 13 and 14 has a pair of apertured spaced parallel mounting and guiding brackets 17 and 18 rigidly attached along the inner edges thereof as by welding in outstanding relation thereto. The apertures through the outermost brackets 17 are respectively square in shape and the aligned apertures through the inner brackets 18 are substantially circular in shape in the form illustrated.

Each pair of guiding and retaining brackets 17 and 18 has a radially disposed traction element which in the form of the invention illustrated, is a resiliently projected pin 19, with a chisel pointed tip 19a removably attached thereto as by rivets 19b and extending outwardly therebeyond and beyond the periphery of the wheel 8 when attached thereto. High tension springs 20 respectively urge the traction pins 19 outwardly into normally projected position. Collars 21 are fixed respectively to traction pins 19 in outwardly spaced relation to inner guiding and retaining brackets 18 and springs 20 are respectively interposed between collars 21 and brackets 18. The inner portion of each of the said traction pins 19 is substantially round in cross-section and has a threaded portion at the inner extremity thereof. The traction pins 19 are respectively mounted in the pairs of guiding and retaining brackets 17 and 18 and the springs 20 are respectively inserted in position between inner brackets 18 and collars 21 and thereafter retaining nuts 22 are respectively mounted on the inner extremities of said traction pins 19. The lower portion of the traction pins 19 is substantially square in cross-section and is received respectively by the square apertures formed in the outer guiding brackets 17 to prevent rotation of the pins on a longitudinal axis during the operation thereof.

The tension in springs 20 is strong enough to normally maintain the traction pins 19 in outwardly projected position so that the sharpened outer extremity of tips 19a will normally penetrate the ground surface on which the vehicle is being operated. When the tips 19a become dull or broken they can be easily replaced. If the resistance to penetration offered by the ground surface becomes too great as when a traction pin engages a rock or some other impenetrable object, then and only then, will the springs 20 permit the traction pins 19 to be retracted in order to prevent said pins from becoming broken. The projection force of the pin is such that the sharpened outer extremity thereof will penetrate ice, hard-packed snow and other similar surfaces which have such a low coefficient of friction that little if any traction can be obtained thereon by conventional vehicle wheels. It should be noted that my improved traction device is particularly efficient when operated on hard-packed snow or ice while at the same time affording effective traction in mud and soft snow.

It will be seen that I have provided a traction device which can be easily and quickly attached to the driving wheels of a vehicle. Since the device need only be attached to one side thereof, it is not necessary to reach around behind the wheel as is required when using conventional chains even when they are of the clamp-on type. The apertures 15 are merely aligned with the studs 9 and the studs respectively inserted therethrough. The retaining pins 10 securely hold the respective plates 14 attached to the vehicle wheel. The studs 9 may remain on the vehicle wheel during the winter months or permanently if so desired.

It will, of course, be understood, that various changes may be made in the form, details, arrangement and proportions of the parts without departing from the scope of my invention.

What I claim is:

A traction device for automotive vehicles comprising a supporting frame structure adapted to be attached to the outerside portion of a vehicle driving wheel and including a pair of spaced concentric rings and a plurality of interconnection plates fixed thereto and traversing the space therebetween, certain of said interconnection plates having apertures therethrough to receive outstanding studs of said vehicle driving wheels for attachment to said wheels, means for retaining said frame structure on said studs, several pairs of spaced opposed outstanding pin-guiding and retaining brackets, each pair of said brackets having radially aligned apertures respectively formed therein, a traction pin mounted in said radially aligned apertures for longitudinal sliding movement radially of said wheel, a plurality of high tension resilient springs respectively associated with said traction elements and one of the respective outstanding brackets for normally urging said traction elements into outwardly projected position to normally penetrate the surface on which the vehicle is supported but permitting retraction of said pins if an impenetrable surface is engaged thereby, each of said studs having a co-operating retaining element formed therein and the means for retaining said supporting frame structure on said wheel comprising a plurality of transverse retaining pins with resilient means for holding the same in retaining position in said co-operating elements of said outstanding studs.

RAY H. WEEKS.

REFERENCES CITED

The following references are of record in the file of this patent:

UNITED STATES PATENTS

| Number | Name | Date |
|---|---|---|
| 1,151,371 | Miller | Aug. 24, 1915 |
| 1,267,837 | Banning | May 28, 1918 |
| 1,400,358 | Gunderman | Dec. 13, 1921 |
| 1,430,291 | Denson | Sept. 26, 1922 |